April 30, 1940.   D. R. GROSSMAN   2,198,812
AUTOMOBILE BODY HEATER
Filed June 17, 1937
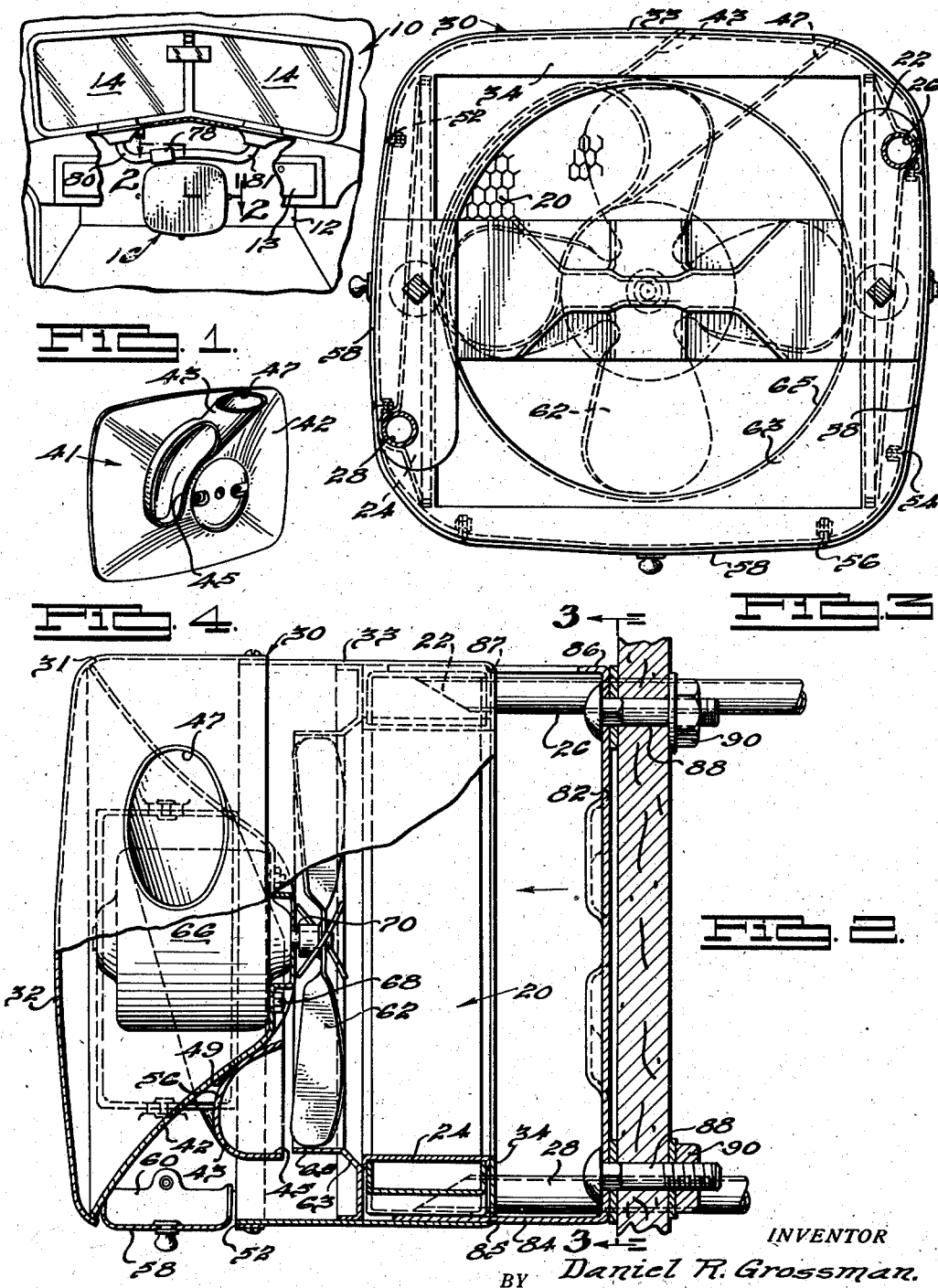
INVENTOR
Daniel R. Grossman.
BY Harness, Dickey & Pierce
ATTORNEYS.

Patented Apr. 30, 1940

2,198,812

UNITED STATES PATENT OFFICE 2,198,812

AUTOMOBILE BODY HEATER

Daniel R. Grossman, Windsor, Ontario, Canada, assignor to Burd Piston Ring Company, Rockford, Ill., a corporation of Illinois Application June 17, 1937, Serial No. 148,677

3 Claims. (Cl. 257—137)

This invention relates to improved heaters and particularly to heaters of the type adapted to be mounted in the passenger compartments of automobiles for heating the interiors thereof.

The present invention is common in certain respects to the structures described and claimed in the copending application of Daniel R. Grossman, Serial No. 148,676, filed on even date herewith.

Objects of the present invention are to provide an improved and simplified heater structure by which the heated air may be discharged from the heater in an improved manner both into the passenger compartment of a vehicle and also against the inner face of the vehicle windshield for preventing the formation of frost or ice thereon; to provide a novel air deflecting member which is adapted for use with automobile body heaters; and to provide a compact heater structure which is economical to manufacture and efficient in use.

Other objects of the invention will become apparent from the following specification, the drawing relating thereto and from the claims hereinafter set forth.

In the drawing in which like numerals are used to designate like parts in the views throughout:

Figure 1 is a fragmentary elevational view, with parts broken away, of a vehicle having associated therewith a heating unit embodying features of the present invention;

Fig. 2 is an enlarged partial top plan view and partial cross-sectional view taken substantially along the line 2—2 of Fig. 1;

Fig. 3 is a vertical elevational view taken substantially along the line 3—3 of Fig. 2;

Fig. 4 is a perspective view on a smaller scale illustrating a novel air deflecting member according to the present invention.

The present invention is directed to an automobile heater of the type which is adapted to be mounted within the passenger compartment of an automobile, and which includes a core which is heated by steam or hot water, and a motor driven fan which circulates air in the body through the core for the purpose of heating the air. Also the present invention is directed to the type of heater in which a portion of the heated air is directed against the inner face of the automobile windshield independently of a main body of air from the heater which is directed to the passenger compartment. The air directed against the inner face of the windshield removes any moisture in the form of frost, or the like, that tends to collect on the windshield, and also melts any snow or ice on the exterior of the windshield thus insuring proper vision for the driver.

In the type of heater to which the present invention is directed, the manner in which the heated air is directed into the passenger compartment is important; and according to the present invention, the main body of air which is discharged from the heater is discharged towards the sides and towards the floor of the vehicle so that the heated air is properly diffused within the passenger compartment.

According to the present invention a novel type of air deflecting member is provided which includes a main flared or dish-shaped deflecting member positioned adjacent one face of the core for directing the main portion of heated air into the passenger compartment, and a curved tubular member having an inlet opening directed toward the core for conducting a portion of the heated air for discharge against the inner face of the vehicle windshield.

Referring to the drawing, an automobile 10 is illustrated having a dashboard 12, an instrument panel 13, windshields 14, and a heater assembly 16 mounted on a supporting member, preferably the dashboard 12 of the vehicle within the passenger compartment.

The heater assembly 16 includes a heating core generally indicated at 20 which is preferably substantially rectangular in shape and is of the honeycomb type, in the embodiment illustrated. It is to be understood that the particular type of core per se does not form a feature of the present invention, and that any of the known types of cores may be used in the arrangement and combination described and claimed within the scope of the present invention. For example, rather than using the honeycomb type of core, a tube and fin type could be used, or a circular core in which the air is drawn radially inwardly through the core and axially of the core could be used. The core 20 illustrated includes header members 22 and 24 which communicate with the honeycomb structure in the usual way.

In order to communicate the headers and the water cooling system of the engine, an upper header tube 26 communicates with the interior of the header 22; and a lower header tube 28 communicates with the interior of the header 24. The header tubes 26 and 28 extend through the dashboard 12 and are connected to the engine cooling system in the usual way. The heating medium is thus derived from the engine cooling system and passes through the tubular member 26 into the header 22 from which the heating medium circulates through the core structure to the header 24 and is returned through the header tube 28 to the engine cooling system.

The heater assembly 16 also preferably includes a housing member 30 which is preferably substantially rectangular in shape and which is formed of a front section 31 and a rear section 33, the two sections being assembled preferably in telescopic relation to provide the housing 30. The front housing section 31 has a closed front face 32; and the rear housing section 33 has an open rear face 34. The opening in the rear face 34 of the housing is defined by inwardly directed flanges around the edges of the housing; and the heating core 20 is mounted within the rear housing section 33 adjacent the rear open face thereof so that the sides of the housing engage the sides of the core and thereby position the core within the heater.

An air deflecting member 41 which includes a flared or dish-shaped air deflecting member 42 is mounted adjacent the outlet side of the core within the housing. The deflecting member 42 is curved or flared outwardly from its longitudinal axis so that its outer marginal edges of the deflector 42 are substantially complementary in shape to the walls of the housing 31. The edges of the member 42 engage the housing section 31 adjacent the juncture of the front wall 32 with the side walls of the housing section. A curved tubular member 43 having an inlet opening 45 and an outlet opening 47 is positioned on the curved surface of the air deflector 42 and suitably fixed thereto, as indicated at 49, in such a position that the inlet opening 45 is directed toward the outlet side of the heating core when the deflecting member is in its assembled position within the heater. The tubular member 43 forms a scoop or air conduit for collecting a portion of the heated air for direction against the inner face of the windshield as will become more apparent hereafter.

In order to discharge the heated air directly into the passenger compartment of the vehicle, elongated discharge openings 52 and 54 are provided in the upstanding side walls of the housing section 31, and an elongated opening 56 is provided in the bottom wall of the housing section 31, these openings communicating the air discharge chamber formed between the deflecting member 42 and the core 20 with the vehicle passenger compartment. The openings 52, 54, and 56 are preferably located adjacent the front corners of the housing section 31 and adjacent the region at which the marginal edges of the deflector 42 engage the housing so that as the heated air is passed through the heating core, it is swept or directed outwardly by the sweeping walls of the deflector 42 and directed through the discharge openings.

In order to control the direction and volume of air passed through the discharge openings, pivoted doors or shutters 58 are mounted within the discharge openings 52, 54, and 56 for pivotal movement about longitudinal axes so that by controlling the position of the doors 58, the direction and volume of air passed through the discharge openings may be suitably controlled. The pivotal mounting for the doors may comprise inwardly directed flanges 60 at the ends of the doors which are provided with openings therethrough for receiving pivot pins which may be suitably secured to the heater housing.

In order to pass the air through the heating core and discharge the heated air from the heater assembly, a fan 62, preferably of the propeller type, is mounted within the housing between the deflector 41 and the outlet face of the core 20. A member 63 is mounted within the housing adjacent the outlet side of the core and has an annular ring portion 65 which is adapted to be mounted in surrounding relation to the fan blades 62 for providing a confining passage for the air drawn through the core by the fan member 62.

A motor 66 is mounted within the deflector member 41 in the space between the deflector member 42 and the housing wall 32, thus shortening the depth of the heater assembly, and may be secured in position by bolts 68, or the like, which extend through the deflector member 42 and are secured to the motor housing. The propeller fan members 62 are mounted on a motor shaft 70 for rotation therewith.

In order to conduct the heated air from the tubular member 43 to a position adjacent the inner faces of the vehicle windshield along the lower edges thereof, a T-shaped tubular fitting member 78 is provided which is adapted to cooperate with the tubular member 43. The fitting member 78 has associated therewith elongated tubular conduit members 80 and 81 which extend, preferably behind the instrument panel 13 of the automobile, to positions adjacent the inner surfaces of the windshields 14 along the lower edges thereof. Openings or slots may be provided through the instrument panel adjacent the outlets of the conduit members 80 and 81 for directing the air from the conduit upwardly against the inner faces of the windshield.

In order to mount the heater assembly to the vehicle within the passenger compartment, a U-shaped bracket or strap member 82 having normally bent end portions 84 and 86 is positioned across the rear open face of the heater housing. The end portions 84 and 86 extend through slots 85 and 87, respectively, in the rear housing wall 34. Those portions of the strap portions 84 and 86 which extend into the housing member engage the wall surfaces of the housing member and may be suitably fixed thereto as by spot welding, or the like. The bracket may be fixedly secured to the dash 12 by means of bolts 88 and nuts 90, or the like, which extend through the dash. The open rear face 34 of the heater casing is thus positioned in spaced relation from the dashboard 12 so that the entering air has free access to the inlet side of the core 20 for passage therethrough.

In the operation of the structure so far described, upon rotation of the members 62 air from within the passenger compartment is drawn into the heater assembly through the open rear face 34 and is caused to pass through the heating core and be heated thereby. The heated air is directed against the dish-shaped deflector member 42 and a portion of the air is caused to pass through the inlet opening 45 into the tubular member 43. The heated air is discharged directly into the passenger compartment through the openings 52, 54, and 56; and by the arrangement of these openings, the air is directed sidewardly and downwardly of the heater for diffusion within the passenger compartment. The heated air collected within the member 43 is discharged through the openings 47 and directed against the rear faces of the windshields 14 for preventing the formation of frost or ice thereon.

Formal changes may be made in the specific embodiment of the invention described without departing from the spirit and substance of the invention, the scope of which is commensurate with the appended claims.

What is claimed is:

1. In a vehicle heater, a heating structure comprising a heating core, an air deflector mounted adjacent one face of said core, an air scoop mounted adjacent said one face of said core for collecting and discharging a portion of the air passed through said core, a discharge conduit operatively connected to said scoop and extending to a position remote from the heater proper, and a fan member mounted so as to pass air through said core against said deflector and into said scoop for discharging the air from said heater, the face of said deflector being constructed and arranged coaxially with said fan to deflect the major volume of air and said scoop being constructed and arranged to cover a minor sector of said deflector face.

2. In a vehicle heater, a heating structure comprising a heating core, an air deflector mounted adjacent one face of said core, a housing member mounted in surrounding relation to said deflector and cooperating with said deflector to form an air discharge chamber, an air scoop mounted within said discharge chamber for collecting and discharging a portion of the air from within said discharge chamber, an air discharge opening in said housing communicating with said discharge chamber, a discharge conduit operatively connected to said scoop and extending to a position remote from the heater proper, and a fan member mounted so as to pass air through said core against said deflector and into said scoop for discharging air through said discharge opening and through said discharge conduit, the face of said deflector being constructed and arranged coaxially with said fan to deflect the major volume of air and said scoop being constructed and arranged to cover a minor sector of said deflector face.

3. In a vehicle heater, a heating structure comprising a heating core, a flared deflector mounted adjacent one face of said core, a housing member mounted in surrounding relation to said deflector and cooperating with said deflector to form an air discharge chamber, means forming an air confining conduit mounted within said discharge chamber having an air scoop entrance and so constructed as to collect and discharge a portion of the air from within said discharge chamber, a discharge conduit operatively connected to said last named means and extending to a position remote from the heater proper, an air discharge opening in said housing communicating with said discharge chamber, and a fan member mounted so as to pass air through said core against said deflector into said means for discharging air through said discharge opening and through said discharge conduit, the face of said deflector being constructed and arranged coaxially with said fan to deflect the major volume of air and said scoop being constructed and arranged to cover a minor sector of said deflector face.

DANIEL R. GROSSMAN.